United States Patent [19]
Kobayashi

[11] Patent Number: 5,461,007
[45] Date of Patent: Oct. 24, 1995

[54] PROCESS FOR POLISHING AND ANALYZING A LAYER OVER A PATTERNED SEMICONDUCTOR SUBSTRATE

[75] Inventor: Thomas S. Kobayashi, Austin, Tex.

[73] Assignee: Motorola, Inc., Schaumburg, Ill.

[21] Appl. No.: 253,013

[22] Filed: Jun. 2, 1994

[51] Int. Cl.$^6$ .................... H01L 21/302; H01L 21/463
[52] U.S. Cl. ............................. 437/225; 437/228
[58] Field of Search .................. 156/635–639; 437/225, 228; 365/357; 51/281 R, 283 R, 131.3

[56] References Cited

U.S. PATENT DOCUMENTS

| | | | |
|---|---|---|---|
| Re. 34,425 | 11/1993 | Schultz | 51/165.74 |
| 4,147,435 | 4/1979 | Habegger | 356/357 |
| 4,660,980 | 4/1987 | Takabayashi et al. | 356/357 |
| 5,036,015 | 7/1991 | Sandhu et al. | 437/8 |
| 5,220,405 | 6/1993 | Barber et al. | 356/357 |
| 5,305,089 | 4/1994 | Hosoe | 356/356 |

OTHER PUBLICATIONS

Abe, et al.; "Microroughness Measurements on Polished Silicon Wafers," Japanese Journal of Appl. Phys.; vol. 31, Pt. 1, No. 3; pp. 721–728 (1992).

Horio, et al.; "Comparison of some instruments for measuring mirrorlike surfaces;" Nanotechnology; vol. 2, No. 1; pp. 33–38 (1991).

Montgomery, et al.; "Three dimensional nanoprofiling of semiconductor surfaces;" SPIE; vol. 1332; pp. 515–524 (1990).

Primary Examiner—Olik Chaudhuri
Assistant Examiner—H. Jey Tsai
Attorney, Agent, or Firm—George R. Meyer

[57] ABSTRACT

A layer over a patterned semiconductor is polished and analyzed to determine a polishing endpoint. The analysis may be performed using reflected radiation beams or by a radiation scattering analyzer. The analysis may be performed on virtually any layer using a radiation source. The analysis may be performed with a liquid, such as an aqueous slurry, contacting the substrate. The polishing and analysis may be integrated such that both steps are performed on the same polisher.

30 Claims, 4 Drawing Sheets

FIG.14

PROCESS FOR POLISHING AND ANALYZING A LAYER OVER A PATTERNED SEMICONDUCTOR SUBSTRATE

FIELD OF THE INVENTION

The present invention relates to polishing semiconductor substrates, and in particular, to polishing layers that overlie previously patterned semiconductor substrates.

BACKGROUND OF THE INVENTION

Planarization of layers over semiconductor substrates is becoming increasingly more important as step coverage issues play a more predominant role in the manufacturing of semiconductor devices. Endpoint detection of polishing steps is becoming an important area within the field of polishing.

Polishing of semiconductor substrates has been performed since the time when semiconductor wafers were first made. A number of optical and other methods exist for determining when polishing endpoint has occurred. These methods include acoustical wave generation and detection, thermal imaging, friction sensing, impedance or capacitance measurements, monitoring the current of the motor used to rotate a wafer against a polishing pad, stylus profilometry, phase shift interferometry, light scattering analysis, scanning tunneling microscopy, atomic force microscopy, and three dimensional optical profiling.

Generally, monitoring substrates during polishing is more difficult when the substrate has been previously patterned compared to an unpatterned substrate. For an unpatterned substrate, such as a silicon wafer or the like, no underlying topography exists. Therefore, whatever topography is seen by the monitor is also present on the surface and is not a topography of an underlying surface. A similar result may hold for a single layer over an unpatterned substrate because the unpatterned substrate may be assumed to be substantially flat.

Monitoring the polishing of a layer over a previously patterned semiconductor substrate is harder. For many optical methods, distinguishing between the topography changes of the underlying patterned semiconductor substrate and the topography changes in the layer being polished may be nearly impossible to discern. Optical methods also suffer because many layers, such as metallic layers, are opaque to light. An anti-reflective coating (ARC), particularly for metal layers, makes optical thickness measurement difficult because an ARC on a metal layer does not give reliable measurements. Stacked oxides (one oxide on another oxide) also has optical measurement problems because the readings for the thickness typically include a cumulative error, which can be a problem with process control at a specific step. Mechanical methods, such as dragging a stylus across a surface of the layer may be used, but dragging a stylus across the surface of the layer may damage the layer.

Analysis of polished layers over patterned semiconductor substrates is typically performed by drying the substrates and moving the substrates to an analyzer. After polishing and before analysis, many polishing processes require a "light-duty" polishing step to remove slurry particles from the surface of the layer before it is dried. Otherwise, some of the slurry particles may become dried on the surface of the layer and may become very difficult to remove. The drying is required because many types of analytical equipment cannot accurately analyze the layer if it is wet or has particles on it. Moving the substrate between the polisher and the analytical equipment is typically performed by operators. The additional handling adds to costs and the additional handling typically causes yields to lower.

SUMMARY OF THE INVENTION

The present invention includes a process for polishing a layer over a patterned semiconductor substrate comprising the steps of forming the layer having a first exposed surface over the patterned semiconductor substrate, polishing the layer to form a second exposed surface, and analyzing the second exposed surface. The analysis is performed using a radiation beam that is directed towards the second exposed surface and at a first angle relative to the second exposed surface. At least a portion of the radiation beam is reflected away from the second exposed surface to form the reflected beam. The reflected beam is at a second angle relative to the second exposed surface, which is within five degrees of a supplementary angle of the first angle. A detector analyzes the reflected beam to determine a detected intensity. If the detector is positioned to detect the reflected beam that is within five degrees the supplementary angle of the first angle, the step of polishing is repeated if the detected intensity is lower than a threshold intensity. If the detector is positioned to detect the reflected beam that is not within five degrees the supplementary angle of the first angle, the step of polishing is repeated if the detected intensity is higher than a threshold intensity.

The present invention also includes a process for polishing a layer over a patterned semiconductor substrate comprising the steps of forming the layer having a first exposed surface with a first topography over the patterned semiconductor substrate, polishing the layer to form a second exposed surface having a second topography, analyzing the second exposed surface with a radiation beam to form a polished output that includes information related to topography changes along the second exposed surface, and comparing the polished output with a standardized output or a first output, which is related to topography changes along the first exposed surface. The step of polishing is repeated if the polished output is outside a tolerance of the standardized or first output.

The present invention further includes a process for polishing a layer over a patterned semiconductor substrate comprising the steps of forming a layer having a first exposed surface over the patterned semiconductor substrate, wherein the layer has a first exposed surface; polishing the layer to form a second exposed surface with a slurry having slurry particles; analyzing the second exposed surface with a radiation beam; and drying the substrate after the step of analyzing. The step of analyzing is performed prior to drying the substrate and after the step of polishing.

The present invention includes process for polishing a layer over a patterned semiconductor substrate comprising the steps of forming the layer over the patterned semiconductor substrate, wherein the layer has a first exposed surface; polishing the layer to form a second exposed surface; and analyzing the second exposed surface. A radiation beam is directed towards the second exposed surface. At least a portion of the radiation beam is reflected away from the second exposed surface to form a reflected beam. A detector analyzes the reflected beam to whether a characteristic is detected. If the characteristic is detectable prior to polishing, the step of polishing is repeated if the characteristic is detected. If the characteristic is not detectable prior to polishing, the step of polishing is repeated if the characteristic is not detected.

Other features and advantages of the present invention will be apparent from the accompanying drawings and from the detailed description that follows.

BRIEF DESCRIPTION OF THE DRAWINGS

The present invention is illustrated by way of example and not limitation in the figure of the accompanying drawing, in which like references indicate similar elements, and in which.

DETAILED DESCRIPTION OF EMBODIMENTS

The embodiments of the present invention may be used to determine a polishing endpoint for a layer, even if the layer is opaque to radiation used for analysis. The analysis of a polished layer may be performed while a liquid in contact with the substrate. As such, the steps of polishing and analyzing may be performed on a single piece of equipment. The present invention is better understood with the embodiments described below.

Reflected Beam Analysis

Figure 1:
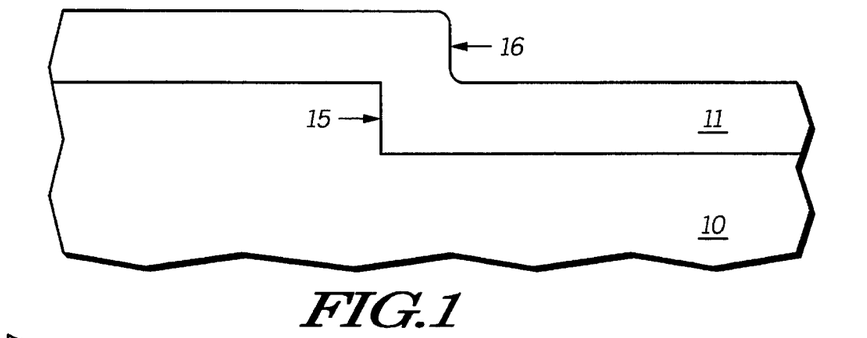
FIG. 1 includes an illustration of a cross-sectional view of a portion of a patterned semiconductor substrate with a layer overlying the substrate.

FIG. 1 includes an illustration of a portion of a patterned semiconductor substrate 10 with a layer 11 overlying the substrate 10. Edge 15 corresponds to an edge in the patterned substrate, and edge 16 corresponds to an edge in the layer 11. The substrate 10 has a substrate topography, and the layer 11 has a pre-polishing exposed surface having a pre-polishing topography that is similar to the substrate topography. A list of all possible types of patterned semiconductor substrates 10 and layers 11 is large and a such comprehensive listing would be virtually impossible to compile. A few examples are listed below. The patterned semiconductor substrate 10 may include trenches within a silicon material, and the layer 11 may include an insulating material. The layer 11 would be polished to form trench field isolation. In another embodiment, the patterned substrate 10 may include an insulating layer having openings overlying a silicon wafer. The layer 11 may include a conductive layer and is polished so that the layer 11 forms contact plugs, via plugs, or interconnects within the openings of the patterned substrate 10. In still another embodiment, the patterned substrate 10 includes interconnects lying on a first insulating layer. (The combination of the interconnects and first insulating layer are illustrated as the patterned substrate 10.) The layer 11 is a second insulating layer that includes an insulating material. The layer 11 is polished until layer 11 is planar or until the patterned substrate 10 becomes exposed. This list is to illustrate embodiments of the present invention and is not meant to limit the present invention.

The extent of polishing may be determined by analyzing the intensity of a reflected beam to determine when a polishing endpoint has been reached. The layer 11 may be transparent or opaque to the radiation beam used for monitoring the polishing.

Figure 2:
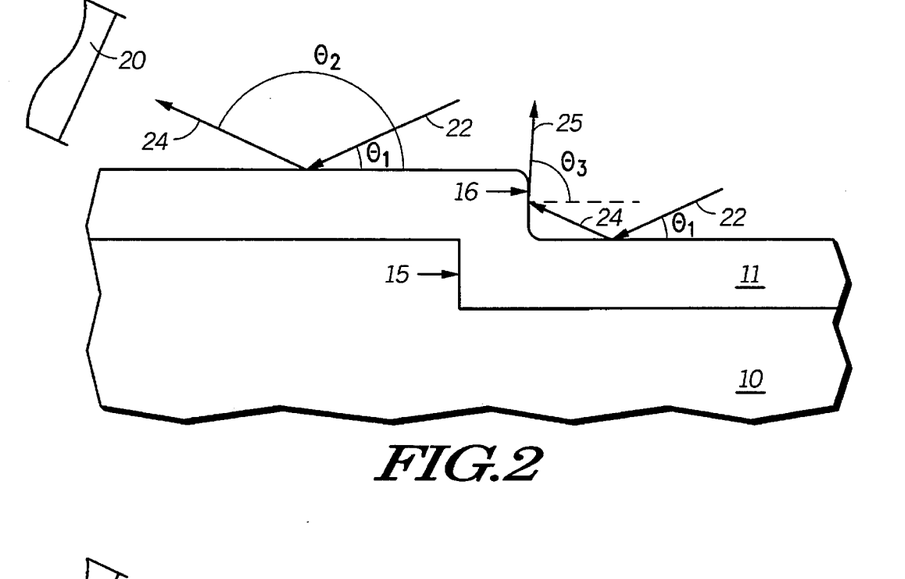
FIG. 2 includes an illustration of a cross-sectional view of the substrate of FIG. 1 before the layer has been polished.

FIG. 2 includes an illustration of a cross-sectional view of the patterned substrate 10 and layer 11 prior to polishing. FIG. 2 includes an illustration of incident radiation beams 22 at an incident intensity that are directed to the pre-polishing surface of the layer 11 at an incident angle $\theta_1$. The incident beams 22 are reflected off the pre-polished surface to form primary reflected beams 24 that travel away from the surface at an angle $\theta_2$, which is within five degrees of the supplementary angle of $\theta_1$. For example, if $\theta_1$ is 10 degrees relative to the flat surface of layer 11, $\theta_2$ may be 170 degrees relative to the flat surface of layer 11. Both the incident beams 22 and primary reflected beams 24 travel in a direction parallel to the plane of FIG. 2.

The primary reflected beam 24 near the right-hand side of FIG. 2 (right reflected beam 24) is reflected off the edge 16 to form a secondary reflected beam 25. The secondary reflected beam 25 travels away from the surface at an angle $\theta_3$. In general, the secondary reflected beam 25 should be reflected off the edge 16 at an angle in a range of 80–100 degrees relative to the incident beams 22. If a plurality of secondary reflected beams 25 are generated, they may actually form a plane oriented perpendicular to the plane of FIG. 2. For one incident beam 22 where $\theta_1$ is 10 degrees relative to the flat surface of layer 11 and travels in a direction parallel to the plane of FIG. 2, secondary reflected beam 25 may travel out of FIG. 2 toward the reader at $\theta_3$, which may be about 15 degrees relative to the flat surface of layer 11. The incident beam 22 and the secondary reflected beam 25 are perpendicular to each other because incident beam 22 travels in a direction along the plane of FIG. 2 and secondary reflected beam travels out of the surface of the FIG. 2. Alternatively, secondary reflected beam may travel away from the reader. Note that the primary reflected beam 24 near the left-hand side of FIG. 2 (left reflected beam 24) is unaffected.

A detector 20 may be placed away from the substrate 10 and layer 11 to detect the primary reflected beams 24 if the primary reflected beams 24 reach the detector 20. If $\theta_1$ is 10 degrees, the detector 20 is positioned, so that it can detect primary reflected beams 24. The left reflected beam 24 is detected by the detector, but the right reflected beam 24 is not detected or detected at a lower intensity compared to the left reflected beam 24 because the right reflected beam 24 is reflected off edge 16. The primary reflected beams 24 reaching the detector 20 may be analyzed to determine the reflected intensity. As used within this specification, "detected intensity" is the total intensity of reflected beams (primary or secondary) that reach a detector. For this particular situation, the detected intensity is the total intensity of primary reflected beams 24 that reach the detector 20 because the secondary reflected beam 25 does not reach the detector 20.

Figure 3:
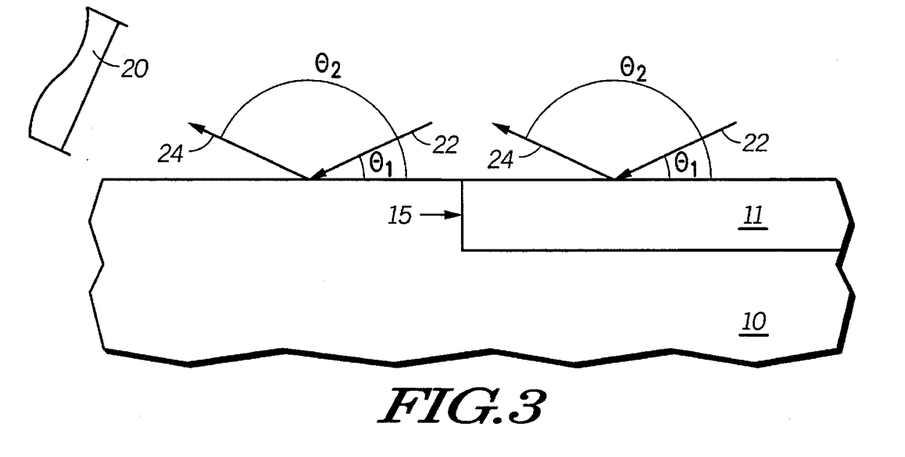
FIG. 3 includes an illustration of a cross-sectional view of the substrate of FIG. 2 after the layer has been polished.

The substrate 10 and layer 11 are polished in a chemical-mechanical polisher to remove a portion of the layer 11 as shown in FIG. 3. Edge 16 is polished away as the surfaces of the substrate 10 and layer 11 become coplanar. After polishing, layer 11 has a post-polishing exposed surface having a post-polishing topography and is analyzed. The two primary reflected beams 24 may be detected by the detector 20. Unlike FIG. 2, the right reflected beam 24 is not reflected off of edge 16 because the edge 16 no longer exists. Therefore, all of the reflected beams 24 should reach the detector 20, and therefore, the detected intensity will be higher. Any further polishing of the substrate 10 and layer 11 will not significantly change the detected intensity.

The polishing endpoint may be determined in at least two different methods. In one method, reflected beams 24 reaching the detector 20 is analyzed to determine a detected intensity. The detected intensity is compared with a threshold intensity. The substrate 10 and layer 11 are further polished if the detected intensity is lower than the threshold intensity. If the layer 11 is relatively smooth, the threshold intensity may be at least 80 percent of the incident intensity of the incident radiation beams 22. If the layer 11 is relatively rough, such as polysilicon that may be used as part of a floating gate electrode for an electrically programmable read-only memory cell, the threshold intensity may be only 50 percent of the intensity of the radiation beams 22. If the analysis is performed using a threshold intensity, a pre-polishing analysis of the substrate 10 and layer 11 is not needed. Once the detected intensity is at least as high as the threshold intensity, the polishing endpoint has been reached.

In another method, reflected beams 24 reaching the detector 20 are analyzed to determine a detected intensity for both pre-polishing and post-polishing. The detected intensities of pre-polishing and post-polishing are compared. If the difference is more than a threshold amount, polishing is repeated. The threshold amount may be five percent or less of the detected intensity of the pre-polishing or post-polishing reflected beams 24. If the polishing is repeated, the detected intensities after the first polishing step and the second polishing step are compared. Once again, if the difference between the detected intensities is more than a threshold amount, polishing is repeated. If the difference is no higher than the threshold amount, the polishing endpoint has been reached.

After the endpoint is detected by any of the methods described above, the polishing may be continued for an additional fixed time to take into account nonuniformity of the layer 11 or the polishing process. For example, polishing may be performed to endpoint, which will be hypothetically assumed to be five minutes. The polishing may be performed for an additional 10–60 seconds. The addition polishing time after endpoint detection is optional, and the length of time for the additional polishing may be in a range of 1–300 seconds.

Figure 4:
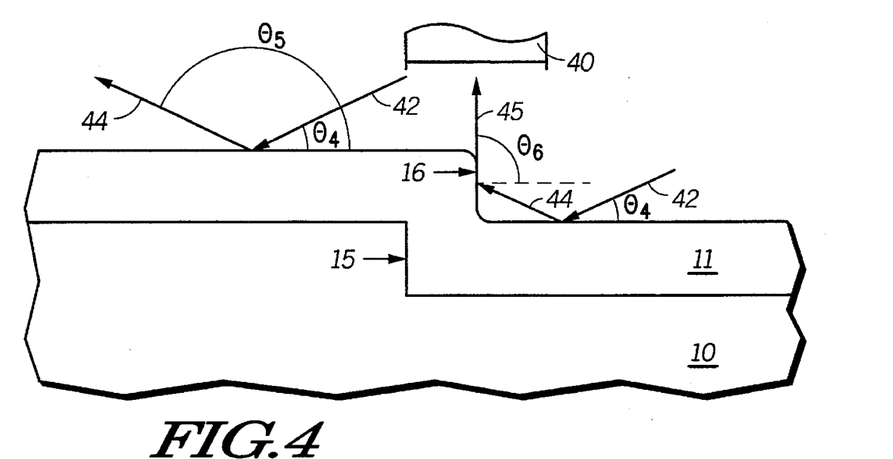
FIGS. 4 and 5 include illustrations of a cross-sectional and top view, respectively, of the substrate of FIG. 1 when irradiated prior to polishing the layer.
Figure 5:
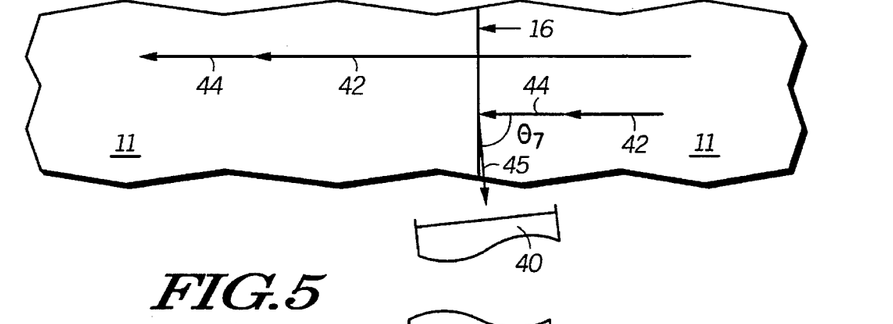

FIGS. 4 and 5 illustrate another embodiment where a detector 40 is positioned to detect reflected beams that are reflected at an angle outside of five degrees of the supplementary angle of incident radiation beams 42. Referring to FIG. 4, the layer 11 is irradiated with the incident radiation beams 42 at an incident intensity that are directed to the pre-polishing surface of the layer 11 at an incident angle $\theta_4$ relative to the flat surface of layer 11. The incident beams 42 are reflected off the pre-polished surface to form primary reflected beams 44 that travel away from the surface at an angle $\theta_5$ relative to the flat surface of layer 11, which is within five degrees of the supplementary angle of $\theta_1$. Beams 42 and 44 travel in a direction along the plane of FIG. 2. For example, if $\theta_4$ is 20 degrees relative to the flat surface of layer 11, $\theta_5$ may be 160 degrees relative to the flat surface of layer 11.

The primary reflected beam 44 near the right-hand side of FIG. 4 (right reflected beam 44) is reflected off the edge 16 to form a secondary reflected beam 45 that is similar to secondary reflected beam 25 of FIG. 2. The secondary reflected beam 45 travels away from the layer 11 at an angle $\theta_6$. For example, if $\theta_4$ is 20 degrees relative to the flat surface of layer 11, $\theta_6$ may be 25 degrees relative to the flat surface of layer 11. The incident beam 42 and the secondary reflected beam 45 are perpendicular to each other because incident beam 42 travels in a direction along the plane of FIG. 4 and secondary reflected beam 45 travels into or out of the surface of the FIG. 4. FIG. 5 includes a top view of FIG. 4. The upper lines with arrows in FIG. 5 correspond to one of the incident beams 42 and the left reflected beam 44. The lower lines correspond to the other incident beam 42, the right reflected beam 44, and the secondary reflected beam. The secondary reflected beam 45 travels at an angle $\theta_7$ relative to both the incident beam 42 and the primary reflected beam 44. Angle $\theta_7$ is typically about 80–100 degrees, and is usually about 90 degrees. When a plurality of secondary reflected beams are formed, the intensity along the plane of secondary reflected beams may not have a uniform intensity along the plane. More specifically, the intensity of reflected beams 45 may be at an angle slightly higher than the incident angle $\theta_1$ when compared to other locations, such as 80 degrees relative to the flat surface of layer 11. Detector 40 should be positioned so that the intensity of the secondary reflected beams 45 reaching the detector 40 is relatively high when edge 16 is present and the detected intensity should be relatively low when edge 16 is not present. For the angles of the specific embodiment described above, the detector 40 may face the surface of FIG. 4 and be oriented so that it is at an angle of about 25 degrees relative to the flat surface of layer 11.

Figure 6:
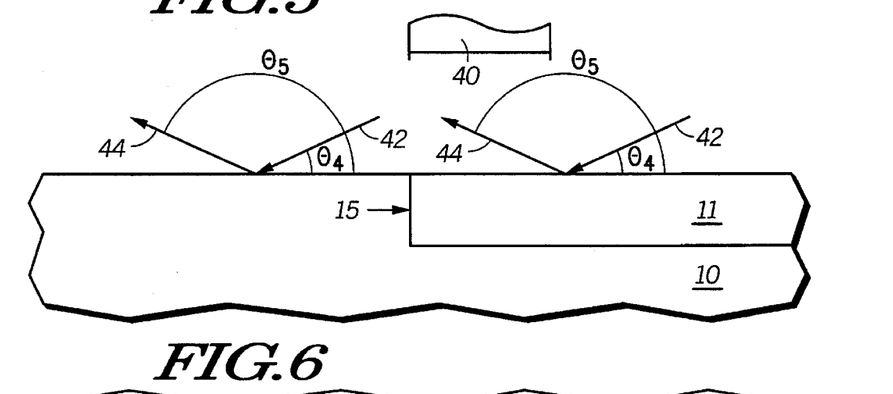
FIG. 6 includes an illustration of a cross-sectional view of the substrate of FIGS. 4 and 5 when irradiated after the layer has been polished.

The substrate 10 and layer 11 are polished in a chemical-mechanical polisher to remove a portion of the layer 11 as shown in FIG. 6. Edge 16 is polished away as the surfaces of the substrate 10 and layer 11 become coplanar. After polishing, layer 11 has a post-polishing exposed surface and a post-polishing topography. Unlike FIG. 4, the secondary reflected beam 45 is no longer formed because the edge 16 no longer exists. After polishing, the substrate 10 and layer 11 are analyzed using the detector 40. No secondary reflected beams 45 should reach the detector 40 because edge 16 has been polished away. Any further polishing of the substrate 10 and layer 11 will not significantly change the detected intensity as detected by the detector 40. In other words, the detector 40 should only have a background (noise) level intensity reaching the detector 40, and this should not change with further polishing.

The endpoint method used with this embodiment may be similar to those discussed with the previous embodiments using detector 20. The detected intensity may be compared to a threshold intensity. Unlike one of the previous embodiments, the polishing endpoint is reached when the detected intensity is no higher than the threshold intensity. The threshold intensity needs to be higher than a background (noise level) of intensity. Otherwise, a polishing endpoint will not be detected. The background level may be determined by analyzing a previously polished substrate that is known to be properly polished and irradiating it. The detector 40 may still detect some reflected beams from the polished or underlying surfaces, such as edge 15. The threshold intensity may be no more than five percent higher than the background intensity, the incident intensity of the incident beams 42, or the secondary reflected beam 45 prior to any polishing of layer 11.

In addition, the endpoint may be detected by a difference similar to one of the embodiments described above. The polishing endpoint is reached when a difference between the detected intensities of secondary reflected beam 45 after two successive polishing steps of the same substrate 10 is less than a threshold amount.

Note that in other embodiments, the detector 40 may be at angles other than 25 degrees relative to the flat surface of layer 11. The detector 40 may be at nearly any angle or plane as long as it does not detect the primary reflected beams 44. Usually, the detector is not oriented to be along the same plane and within five degrees of a supplementary angle of $\theta_4$. Also, a plurality of detectors at the same or different planes or angles compared to $\theta_6$ may be used.

Radiation Scattering Analysis

A radiation scattering analyzer may be used to determine the polishing endpoint. Some particle counters use lasers, such as argon lasers, helium-neon lasers, and the like, to detect surface topography and particles on an exposed surface of a substrate or layer. An output from the particle counter may include a pattern component and a particle component. If possible and desired, the particle component may be disabled so that only a pattern component is present in the output. Similar to the reflected beam embodiments, the radiation scattering may be used to monitor polishing of opaque or transparent layers. The output of the particle counter is monitored for changes to edges or color.

Figure 7:
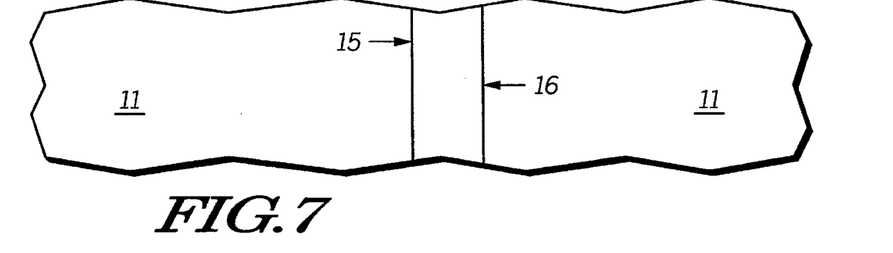
FIG. 7 includes an illustration of a top view of the substrate of FIG. 1 prior to polishing when the layer is transparent.
Figure 8:
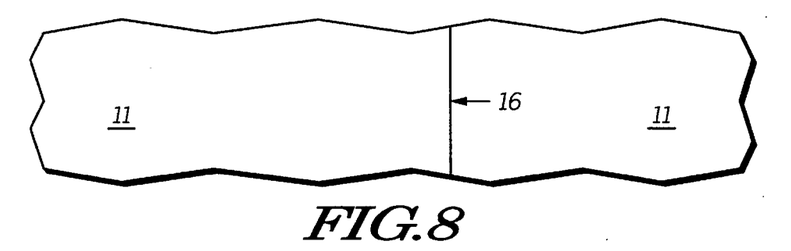
FIG. 8 includes an illustration of a top view of the substrate of FIG. 1 prior to polishing when the layer is opaque.
Figure 9:
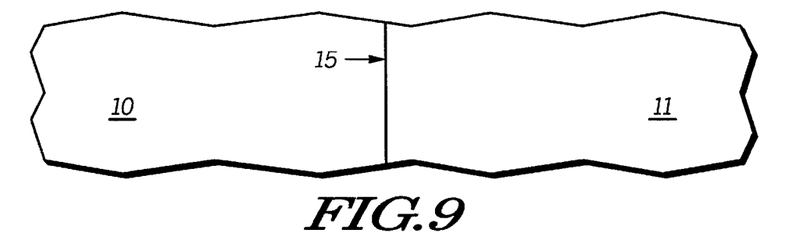
FIG. 9 includes an illustration of a top view of the substrate of FIG. 7 or 8 after polishing the layer.

FIG. 7 includes an illustration of a top view of FIG. 1 if layer 11 is transparent. In FIG. 7, both the edges 15 and 16 are visible. FIG. 8 includes an illustration of a top view of FIG. 1 if layer 11 is opaque. In FIG. 8, only the edge 16 is visible. Polishing is performed to expose a portion of substrate 10 that underlies layer 11 as shown in FIG. 9. Regardless whether layer 11 is transparent or opaque to the radiation, edge 15 is now visible. The endpoint can be determined by the change in signal caused by the disappearance (absence) of edge 16. If the layer 11 is opaque, the endpoint could also be determined by the presence of edge 15. The polishing may be monitored by changes to edges or colors. A standardized output may include the absence of edge 16 or the presence of edge 15 if layer 11 is opaque to the radiation.

Figure 10:
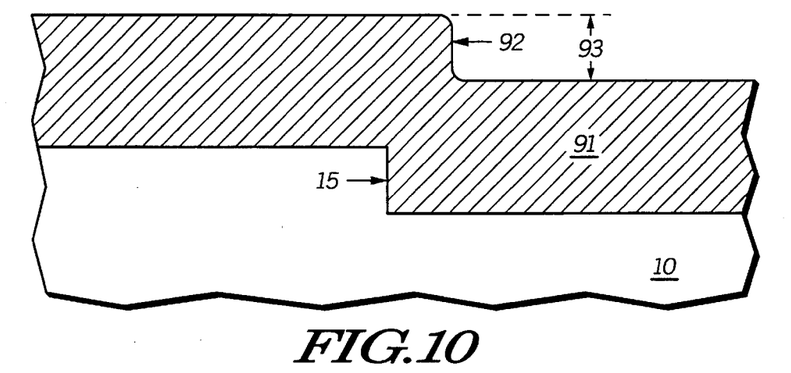
FIG. 10 includes an illustration of a cross-sectional view of a portion of a patterned semiconductor substrate with a layer overlying the substrate.
Figure 11:
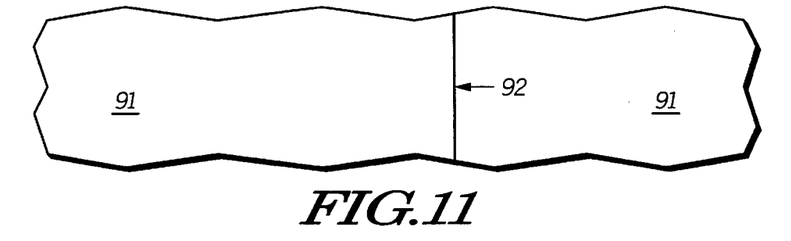
FIG. 11 includes an illustration of an output from a particle counter, wherein the output shows a top view of the substrate of FIG. 10.

Many of the embodiments previously described have addressed polishing the layer 11 and exposing a portion of the underlying substrate 10. The embodiments may also be used when planarizing a relatively thick layer without exposing any portion of an underlying substrate. In this example, layer 11 includes oxide. In other embodiments layer 11 may include a different insulating material, a metal-containing material, a silicon-containing material, or an anti-reflective coating. Layer 11 may also be transparent or opaque to the radiation used. FIG. 10 includes an illustration of a cross-sectional view of a portion of the substrate 10 with a layer 91 overlying the substrate 10 prior to polishing. FIG. 11 includes an output of a particle counter showing the edge 92 from a top view of the layer 91. Because the substrate 10 is patterned and has the edge 15, layer 91 likewise has an edge 92. If layer 11 is transparent to the radiation, edge 15 may be shown in the output, but is not shown to simplify understanding of this embodiment. The height difference 93 near the edge 92 is less than the thickness of layer 91. The layer 91 is to be polished to achieve a planar surface without exposing any portion of the substrate 10.

Figure 12:
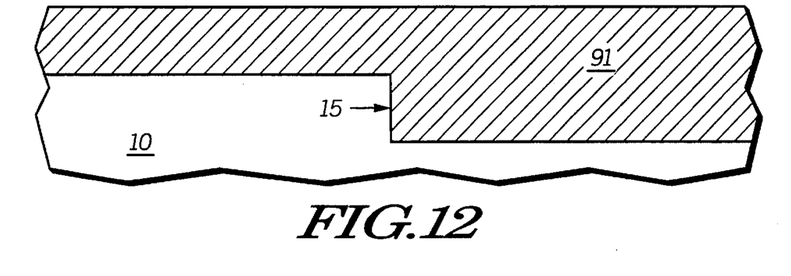
FIG. 12 includes an illustration of a cross-sectional view of the substrate of FIG. 10 after the layer has been polished.
Figure 13:
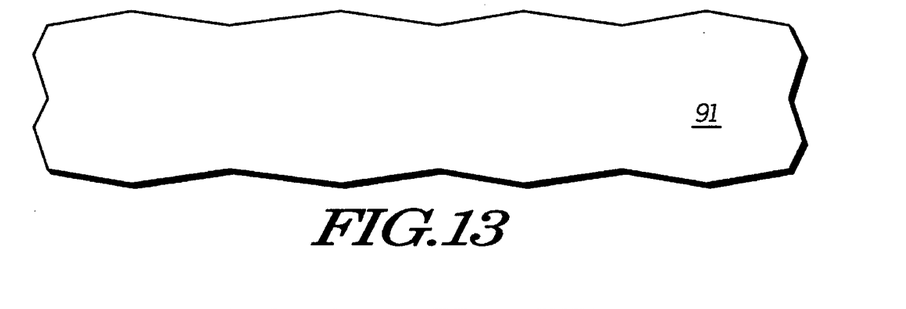
FIG. 13 includes an illustration of an output from a particle counter, wherein the output shows a top view of the substrate of FIG. 12.

The layer 91 is polished to become planar without exposing the underlying substrate 10 as shown in FIGS. 12 and 13. FIG. 12 includes a cross-sectional view, and FIG. 13 includes an output of the particle counter showing a top view of the layer 91. Note that the edge 92 no longer appears. The polishing endpoint may be determined by the absence of edge 92. Over-polishing may be performed similar to the previous embodiments to account for nonuniformities of the layer 91 or polishing process.

In some particle counters, the changes may be detected by a color change in the layer 91 instead of the absence of a line. Also, particle counters may only give information related to the presence or absence of topography changes. They may not give information related to the direction and/or magnitude of the topography changes. With these limitations, a particle counter may still be used to determine the polishing endpoint. Similar to the reflected beam analysis embodiments, a fixed time polishing step may be performed after the endpoint has been reached to account for nonuniformities in the layer 91 or the polishing process.

Characteristic of a Reflected Beam

In yet another embodiment, a detector may be used to determine if a characteristic is present within a reflected beam. Referring to FIG. 9, layer 91 may include many other edges similar to edge 92. The edges may be spaced such that they form a diffraction grading. A spectral (unpolarized) incident radiation beam may be reflected by the diffraction grading to produce a reflected beam that includes polarized radiation. A detector analyzes the reflected beam to determine if the reflected beam includes polarized radiation. If the reflected beam includes polarized radiation, the layer 91 is further polished. After layer 91 is planarized as shown in FIG. 11, the edges 92 and diffraction grading formed by the edges 92 are no longer present. At this point in the process, the reflected beam may no longer include polarized radiation. The detector no longer detects polarized radiation within the reflected beam, which is used to signal a polishing endpoint.

Clearly, a similar process could be used for other characteristics. For example, assume that a reflected beam does not have a characteristic prior to a layer becoming planar and has the characteristic after the layer becomes planar. This change in the characteristic of the reflected beam (not detected to becoming detected) may also be used as an endpoint signal for the polishing process. Polishing is repeated if the characteristic is not detected.

Once again, additional polishing may be performed after the polishing endpoint is reached. The additional polishing is similar to that previously described in the other embodiments. The additional polishing is performed to take into account nonuniformities in the layer 91 or the polishing process.

Process Flow

Figure 14:
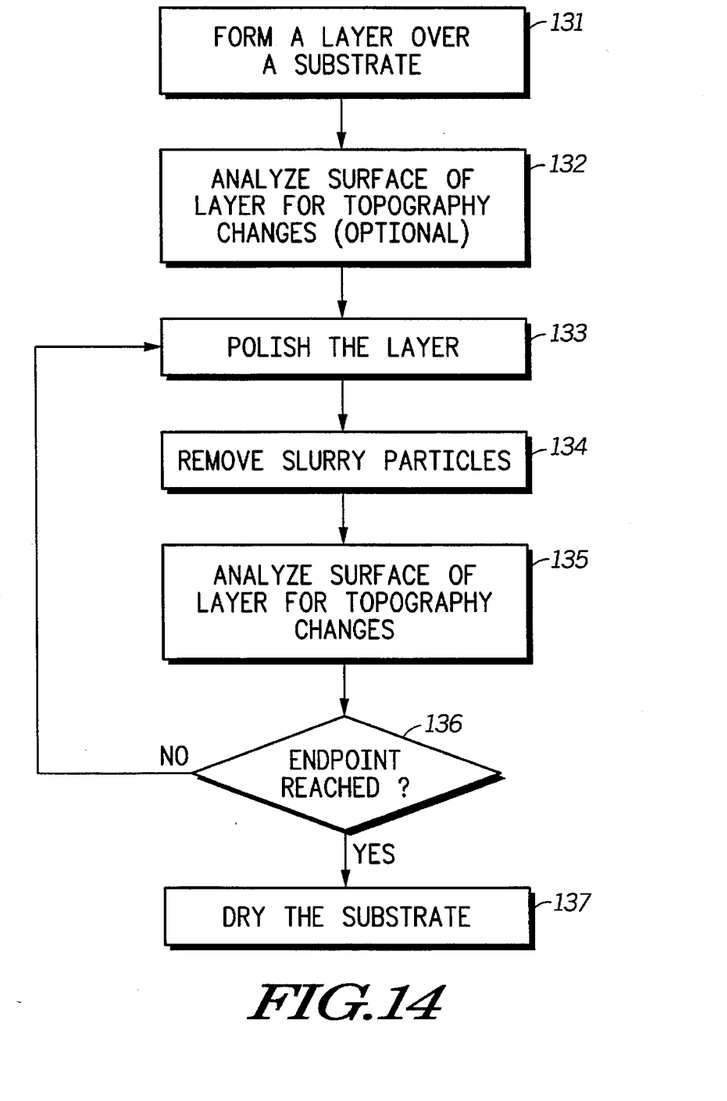
FIG. 14 includes a process flow diagram of an embodiment of the present invention.

A process flow for implementing any of the embodiments is seen in FIG. 14. The steps in the process include:

Form a layer over a patterned semiconductor substrate (131);

Analyze the surface of the layer for topography changes (optional) (132);

Polish the layer (133);

Remove slurry particles (134);

Analyze the surface of the layer for topography changes (135);

Determination of whether endpoint has been reached (136); and

Dry the substrate (136).

Some of these steps have already been described previously. Whether or not the pre-polished layer is analyzed depends on the endpoint detection used. If the endpoint detection analysis compares the pre-polishing and post-polishing outputs, then the pre-polishing analysis should be performed. For other endpoint detection analysis methods, such as those that compare the post-polishing output with a standard output or intensity of the incident beam, then the pre-polishing analysis is not needed.

The embodiments previously described have the capability of being used with a liquid contacting the substrate 10 and/or the layer 11 or 91. More specifically, the substrate may be placed under water during the analysis. The end of the radiation source (i.e., opening for a laser beam or the like) and end of the detector should also be placed under water. Certain precautions may need to be undertaken to reduce the chances that liquids from contacting electrical portions of an analyzer or to reduce contamination of the substrates. A covering, such as a quartz filter may be used. If there is a water interface between the substrate being analyzed and the detector, reflections from the water's surface may interfere with the analysis. Keep in mind that the entire laser and detector do not have to be under water, only the ends where the radiation beam is emitted and where the reflected beams are detected. All of the reflected beams should travel within the same fluid and not cross any fluid interfaces between the point the reflected beams are formed and the detector.

The slurry particles need to be removed before the substrate is dried, but the slurry particle removal step may be performed before or after analysis. If the slurry particles are not removed prior to analysis, the particle component of the particle counter may need to be disabled. If the slurry particles are removed prior to analysis, the particle counter may be used to both determine the particle count and topography.

The radiation used for this or any of the previous embodiments may be at virtually any wavelength, but the detector must be able to detect the radiation for the specific wavelength chosen. Specific types of radiation include optical (visible), infra-red (IR), or ultra-violet (UV). Radiation sources may include lights or lasers.

Benefits

The embodiments previously described have several benefits compared to other methods currently available. The embodiments do not require a special structure for measurement, nor do they require physical contact with the substrate 10 or layer 11. The analysis is also quick compared to many other methods because it may be performed over the entire substrate as opposed to multiple, preselected sites. Also, the embodiments may be used with a layer that is transparent or opaque to the radiation source used. Many conventional optical methods cannot be used for layers that are opaque to light. Other than the embodiments of the present invention, the inventor does not know of any optical method for determining planarization of a metal layer.

Because the analysis may be performed with a liquid contacting the substrate during analysis, an integrated polishing and analysis process may be developed. More specifically, a polisher or another single piece of equipment may be equipped to have one station that polishes and another station that performs the analysis. The integration should reduce substrate handling and reduce equipment idle time caused by stopping to analyze the substrate. Compare this with a conventional analyzing method. In a conventional analyzing method, the analyzer is not part of a polisher. In order to analyze, slurry particles are removed from the substrate, and the substrate is dried. After removing the substrate from the polisher, the substrate is then analyzed. With the embodiments of the present invention, software may be used so that the polishing and analysis steps are automated.

Another benefit is that slurry particles from polishing do not have to be removed before analysis. The "low-level" polishing step to remove the slurry particles does not have to be performed before each time the surface is analyzed. Still, if the slurry particles are removed, a particle counter can analyze for particles and topography changes simultaneously.

Still another benefit of the present invention is the ability to analyze without having to use test wafers or dedicated analysis structures on the substrates. Test wafers are an additional cost and may not accurately reflect actual polishing rates or uniformities on product substrates. A dedicated structure on product substrates occupies valuable area that may be used for an additional semiconductor device on those substrates. Lost area on production substrate translates to lost revenue and profit.

In the foregoing specification, the invention has been described with reference to specific embodiments thereof. However, it will be evident that various modifications and changes can be made thereto without departing from the broader spirit or scope of the invention as set forth in the appended claims. Accordingly, the specification and drawings are to be regarded in an illustrative rather than a restrictive sense.

What is claimed is:

1. A process for polishing a layer over a patterned semiconductor substrate comprising the steps of:

forming the layer over the patterned semiconductor substrate, wherein the layer has a first exposed surface and is an uppermost layer over the substrate;

polishing the layer to form a second exposed surface; and analyzing the second exposed surface, wherein:

a radiation beam is directed towards the second exposed surface at a first angle relative to the second exposed surface;

the layer is opaque to the radiation beam;

at least a portion of the radiation beam is reflected away from the second exposed surface to form a reflected beam;

the reflected beam is at a second angle relative to the second exposed surface, wherein the second angle is within five degrees of a supplementary angle of the first angle;

a detector analyzes the reflected beam to determine a detected intensity; and the step of polishing is repeated if the detected intensity is lower than a threshold intensity.

2. The process of claim 1, wherein step of irradiating is performed while a liquid contacts the second exposed surface.

3. The process of claim 1, further comprising polishing the layer for a fixed time after the detected intensity is at least as high as the threshold intensity.

4. The process of claim 1, wherein the step of analyzing is performed before slurry particles are removed.

5. A process for polishing a layer over a patterned semiconductor substrate comprising the steps of:

forming the layer over the patterned semiconductor substrate, wherein the layer has a first exposed surface and an edge;

polishing the layer to form a second exposed surface; and analyzing the second exposed surface, wherein:
 a radiation beam is directed towards the second exposed surface;
 at least a portion of the radiation beam is reflected away from the second exposed surface to form a primary reflected beam;
 if the edge is still present, at least a portion of the primary reflected beam is reflected away from the edge to form a secondary reflected beam;
 a detector determines whether the secondary reflected beam is present; and
 the step of polishing is repeated if the detector determines that the secondary reflected beam is present.

6. The process of claim 5, wherein step of irradiating is performed while a liquid contacts the second exposed surface.

7. The process of claim 5, further comprising polishing the layer for a fixed time after the detector determines that the secondary reflected beam is not present.

8. The process of claim 5, wherein the step of analyzing is performed before slurry particles are removed.

9. The process of claim 5, wherein the step of analyzing is performed using a radiation scattering analyzer.

10. The process of claim 5, wherein:

the radiation beam and the primary reflected beam lie along a plane; and as seen by a top view of the substrate, the secondary reflected beam is at an angle that is in a range of 80–100 degrees from the plane.

11. A process for polishing a layer over a patterned semiconductor substrate comprising the steps of:

forming the layer over the patterned semiconductor substrate, wherein the layer has a first exposed surface having a first topography;

polishing the layer to form a second exposed surface having a second topography; and analyzing the second exposed surface with a radiation beam to detect topography changes along the second exposed surface, wherein the step of polishing is repeated if a topography change along the second exposed surface is detected, wherein:
 the radiation beam is directed towards the second exposed surface;
 at least a portion of the radiation beam is reflected away from the second exposed surface to form a primary reflected beam;
 the radiation beam and primary reflected beam lie along a plane;
 if an edge is present within the second exposed surface, at least a portion of the primary reflected beam is reflected away from the edge to form a secondary reflected beam; and
 as seen by a top view of the substrate, the secondary reflected beam is at an angle that is in a range of 80–100 degrees from the plane.

12. The process of claim 11, wherein step of analyzing is performed while a liquid contacts the second exposed surface.

13. The process of claim 11, wherein the step of analyzing is performed using a radiation scattering analyzer.

14. The process of claim 11, wherein the step of analyzing forms an output that does not include:

information related to direction and magnitude of topography changes along the second exposed surface; and thickness of the layer.

15. The process of claim 11, wherein:

the layer is transparent; and the step of polishing does not expose any portion of the substrate.

16. The process of claim 11, wherein:

the layer is opaque; and the step of polishing does not expose any portion of the substrate.

17. A process for polishing a layer over a patterned semiconductor substrate comprising the steps of:

forming the layer over the patterned semiconductor substrate, wherein the layer has a first exposed surface having a first topography with an edge;

analyzing the first topography with a radiation beam to form a first topographic output, wherein:
 the radiation beam is directed towards the first exposed surface;
 at least a portion of the radiation beam is reflected away from the first exposed surface to form a primary reflected beam of the first topography:
 the radiation beam and primary reflected of the first topography lie along a plane;
 at least a portion of the primary reflected beam of the first topography is reflected away from the edge to form a secondary reflected beam; and
 as seen by a top view of the substrate, the secondary reflected beam is at an angle that is in a range of 80–100 degrees from the plane;

polishing the layer to form a second exposed surface having a second topography;

analyzing the second topography with a radiation beam to form a second topographic output, wherein:
 the radiation beam is directed towards the second exposed surface;
 at least a portion of the radiation beam is reflected away from the second exposed surface to form a primary reflected beam of the second topography;
 the radiation beam and primary reflected beam of the second topography lie along a plane;
 if an edge is present within the second exposed surface, at least a portion of the primary reflected beam of the second topography is reflected away from the edge to form a secondary reflected beam of the second topography; and
 as seen by a top view of the substrate, the secondary reflected beam of the second topography is at an angle that is in a range of 80–100 degrees from the plane; and comparing the first and second topographic outputs, wherein the step of polishing is repeated if the second topographic output lies within a tolerance the first topographic output.

18. The process of claim 17, wherein step of analyzing the second exposed surface is performed while a liquid contacts the second exposed surface.

19. The process of claim 17, wherein the radiation beam is generated by a laser of a radiation scattering analyzer.

20. The process of claim 17, wherein both of the first and second topographic outputs do not include information related to thickness of the layer.

21. A process for polishing a layer over a patterned semiconductor substrate comprising the steps of:

forming the layer over the patterned semiconductor substrate, wherein the layer has a first exposed surface;

polishing the layer to form a second exposed surface with a slurry having slurry particles;

analyzing the second exposed surface with a radiation beam, wherein:
the radiation beam is directed towards the second exposed surface;
at least a portion of the radiation beam is reflected away from the second exposed surface to form a primary reflected beam;
the radiation beam and primary reflected beam lie along a plane;
if an edge is present within the second exposed surface, at least a portion of the primary reflected beam is reflected away from the edge to form a secondary reflected beam;
as seen by a top view of the substrate, the secondary reflected beam is at an angle that is in a range of 80–100 degrees from the plane; and
this step is performed prior to removing the slurry particles and drying the substrate and after the step of polishing; and drying the substrate after the step of analyzing.

22. The process of claim 21, further comprising a step of removing the slurry particles from the substrate prior to the step of analyzing.

23. The process of claim 21, further comprising a step of removing slurry particles between the steps of analyzing and drying.

24. The process of claim 21, further comprising a step of analyzing the first exposed surface prior to the step of polishing, wherein this step is performed while a liquid contacts the layer.

25. The process of claim 21, wherein the steps of polishing and analyzing are performed while water contacts the layer.

26. The process of claim 21, wherein the steps of polishing and analyzing are performed in a polisher.

27. A process for polishing a layer over a patterned semiconductor substrate comprising the steps of:

forming the layer over the patterned semiconductor substrate, wherein the layer has a first exposed surface;

polishing the layer to form a second exposed surface; and analyzing the second exposed surface, wherein:
a spectral incident radiation beam is directed towards the second exposed surface;
at least a portion of the spectral incident radiation beam is reflected away from the second exposed surface to form a reflected beam;
a detector analyzes the reflected beam to whether reflected beam is polarized; and
the step of polishing is repeated if the reflected beam is polarized.

28. The process of claim 27, wherein the layer is opaque to the spectral incident radiation beam.

29. A process for polishing a layer over a patterned semiconductor substrate comprising the steps of:

forming the layer over the patterned semiconductor substrate, wherein the layer has a first exposed surface;

polishing the layer to form a second exposed surface; and analyzing the second exposed surface, wherein:
a spectral incident radiation beam is directed towards the second exposed surface;
at least a portion of the spectral incident radiation beam is reflected away from the second exposed surface to form a reflected beam;
a detector analyzes the reflected beam to whether the reflected beam is spectral; and
the step of polishing is repeated if the reflected beam is not spectral.

30. The process of claim 29, wherein the layer is opaque to the spectral incident radiation beam.

* * * * *